(12) United States Patent
Wang et al.

(10) Patent No.: US 11,205,838 B2
(45) Date of Patent: Dec. 21, 2021

(54) ANTENNA, COMMUNICATION ASSEMBLY, AND UNMANNED AERIAL VEHICLE

(71) Applicant: SZ DJI TECHNOLOGY CO., LTD., Shenzhen (CN)

(72) Inventors: Dian Wang, Shenzhen (CN); Meng Hu, Shenzhen (CN); Jianping Wei, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 313 days.

(21) Appl. No.: 16/145,412

(22) Filed: Sep. 28, 2018

(65) Prior Publication Data

US 2019/0036204 A1    Jan. 31, 2019

Related U.S. Application Data

(63) Continuation of application No. PCT/CN2016/078362, filed on Apr. 1, 2016.

(51) Int. Cl.
| | | |
|---|---|---|
| *H01Q 1/28* | (2006.01) | |
| *H01Q 9/28* | (2006.01) | |
| *H01Q 5/378* | (2015.01) | |
| *B64C 1/36* | (2006.01) | |
| *B64C 39/02* | (2006.01) | |
| *H01Q 9/06* | (2006.01) | |
| *H01Q 9/16* | (2006.01) | |

(52) U.S. Cl.
CPC .............. *H01Q 1/28* (2013.01); *B64C 1/36* (2013.01); *B64C 39/024* (2013.01); *H01Q 5/378* (2015.01); *H01Q 9/065* (2013.01); *H01Q 9/16* (2013.01); *H01Q 9/28* (2013.01); *B64C 2201/122* (2013.01)

(58) Field of Classification Search
CPC .. H01Q 1/28; H01Q 5/37; H01Q 9/06; H01Q 9/16; H01Q 9/28
USPC ........................................................ 343/705
See application file for complete search history.

(56) References Cited

U.S. PATENT DOCUMENTS

| | | | |
|---|---|---|---|
| 9,166,283 B1 | 10/2015 | Lalezari et al. | |
| 2001/0011964 A1* | 8/2001 | Sadler ...................... | H01Q 9/16 343/824 |
| 2008/0281662 A1* | 11/2008 | Ginsburg ........... | G06Q 30/0273 705/28 |

FOREIGN PATENT DOCUMENTS

| | | |
|---|---|---|
| CN | 1378712 A | 11/2002 |
| CN | 101308958 A | 11/2008 |
| CN | 204289684 U | 4/2015 |
| CN | 104966899 A | 10/2015 |
| CN | 105244613 A | 1/2016 |

(Continued)

OTHER PUBLICATIONS

The World Intellectual Property Organization (WIPO) International Search Report for PCT/CN2016/078362 dated Jan. 10, 2017 7 pages.

*Primary Examiner* — Andrea Lindgren Baltzell
(74) *Attorney, Agent, or Firm* — Anova Law Group, PLLC

(57) ABSTRACT

An antenna includes a substrate and a dipole antenna disposed on a surface of the substrate. The dipole antenna includes a first metal structure and a second metal structure arranged symmetrically with respect to each other. The first metal structure includes a head proximal to the second metal structure, and a tail distal from the second metal structure. A width of the first metal structure varies between the head and the tail.

17 Claims, 9 Drawing Sheets

(56) References Cited

FOREIGN PATENT DOCUMENTS

| GB | 2249924 B | 6/1994 |
|---|---|---|
| WO | 03075404 A1 | 9/2003 |

* cited by examiner

ANTENNA, COMMUNICATION ASSEMBLY, AND UNMANNED AERIAL VEHICLE

CROSS-REFERENCE TO RELATED APPLICATION

This application is a continuation application of International Application No. PCT/CN2016/078362, filed on Apr. 1, 2016, the entire contents of which are incorporated herein by reference.

TECHNICAL FIELD

The present disclosure relates to the field of communication technologies and, in particular, to an antenna, a communication assembly, and an unmanned aerial vehicle.

BACKGROUND

In recent years, with the development of some apparatuses, such as robots and unmanned aerial vehicles (UAVs), an antenna as a part of a communication assembly configured to transmit and receive electromagnetic waves, is widely used in those apparatuses. However, not only a size of the antenna has to fit limited volumes of those apparatuses, but also radiation directions of the antenna have to meet requirements of special application environments of those apparatuses. The antenna in the UAVs is expected to have uniform radiations covered in all directions.

In conventional technologies, the antenna cannot be miniaturized by changing structures of the antennas, and is suitable only for applications in mobile terminals but not for applications in those apparatuses such as the robots, and the UAVs, etc.

SUMMARY

In accordance with the disclosure, there is provided an antenna including a substrate and a dipole antenna disposed on a surface of the substrate. The dipole antenna includes a first metal structure and a second metal structure arranged symmetrically with respect to each other. The first metal structure includes a head proximal to the second metal structure, and a tail distal from the second metal structure. A width of the first metal structure varies between the head and the tail.

Also in accordance with the disclosure, there is provided a communication assembly including an antenna and a metal parasitic unit disposed within a preset distance from the antenna. The antenna includes a substrate and a dipole antenna disposed on a surface of the substrate. An extending direction of the metal parasitic unit is substantially same as an extending direction of the antenna.

Also in accordance with the disclosure, there is provided an unmanned aerial vehicle (UAV), including a fuselage, a metal part disposed at the fuselage, and a communication assembly disposed at the fuselage. The communication assembly includes an antenna and a parasitic unit disposed within a preset distance from the antenna. The antenna includes a substrate and a dipole antenna disposed on a surface of the substrate. An extending direction of the metal parasitic unit is substantially same as an extending direction of the antenna.

REFERENCE NUMERALS FOR MAIN COMPONENTS

1—antenna; 11—substrate; 12—metal structure; 121—head; 122—tail; 123—recess; 124—protrusion; 13—metal via; 14—solder joint; 2—metal parasitic unit; and 3—metal part.

DETAILED DESCRIPTION

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without creative efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

The embodiments of the present disclosure will be described in detail below with reference to the accompanying drawings. In the case of no conflict, the following embodiments and their features can be combined with each other.

Figure 1:
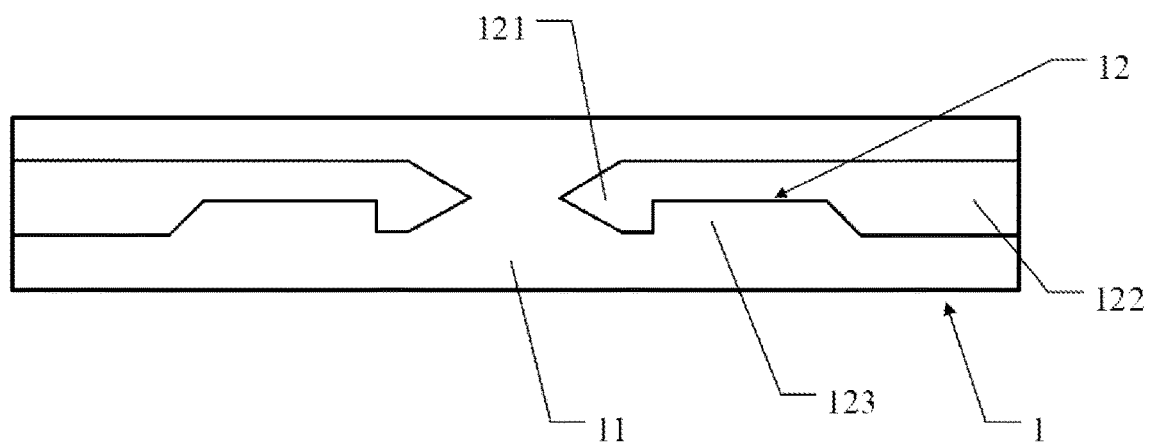
FIG. 1 is a structural diagram of an example of an antenna according to some embodiments of the present disclosure.

One aspect of the present disclosure provides an antenna. FIG. 1 is a structural diagram of an example of an antenna 1 according to some embodiments of the present disclosure. FIG. 1 shows an example of structures of the antenna consistent with the disclosure and is not intended to limit the present disclosure. As shown in FIG. 1, the antenna 1 includes a substrate 11, and a dipole antenna disposed on an upper surface of the substrate 11.

The dipole antenna includes two metal structures 12 (also referred to as a "first metal structure" and a "second metal structure") arranged symmetrically. In some embodiments, as shown in FIG. 1, the metal structures 12 are arranged axisymmetrically to each other. Each of the two metal structures 12 includes a head 121 disposed proximal to another of the two metal structures 12, and a tail 122 disposed distal from the other of the two metal structures 12. A width of a metal structure 12 may change (e.g., become wider or narrower, etc.) from the head 121 to the tail 122. In some embodiments, a width of at least one part of the metal structure 12 between the head 121 and the tail 122 is smaller or larger than a width the head 121 and/or a width of the tail 122. In some embodiments, at least one side of the metal structure 12 between the head 121 and the tale 122 includes at least one recess 123.

In some embodiments, the metal structure 12 may include one or more recesses or one or more protrusions between the head 121 and the tail 122. The one or more recesses and/or the one or more protrusions can form a undulation shape, a zigzag shape or another shape.

The substrate 11 can be a printed circuit board (PCB) substrate. The dipole antenna can be printed onto the upper surface of the substrate 11. The dipole antenna can be configured to send and receive signal within certain fixed frequency range.

In some embodiments, the two symmetrically arranged metal structures 12 of the dipole antenna may be disposed with a preset distance between the metal structures 12, i.e., the heads 121 of the two metal structures 12 are disposed with a preset distance between the heads 121.

In some embodiments, the recess 123 can be disposed at an upper side of the metal structure 12 between the head 121 and the tail 122. In some other embodiments, the recess 123 can be disposed at a lower side of the metal structure 12 between the head 121 and the tail 122. In some other embodiments, the recess 123 can be disposed at both the upper side and the lower side of the metal structure 12 between the head 121 and the tail 122. A number of the recess 123 disposed at one side of the metal structure 12 can be at least one, for example, two or three, etc. As shown in FIG. 1, the recess 123 of the metal structure 12 is disposed at the lower side of the metal structure 12 between the head 121 and the tail 122. The number of the recess 123 is one.

Angles between a bottom edge and two side edges of a recess 123 are not limited in the present disclosure. The angles between the bottom edge and the two side edges of the recess 123 can be the same. The angles between the bottom edge and the two side edges of the recess 123 can be acute angles, obtuse angles, or right angles. In some embodiments, the angles between the bottom edge and the two side edges of the recess 123 can be different. For example, as shown in FIG. 1, an angle between the bottom edge and one side edge of the recess 123 is a right angle, and an angle between the bottom edge and the other side edge of the recess 123 is an obtuse angle.

In some embodiments, the bottom edge of the recess 123 may be close to a central axis of the metal structure 12 or may be distal from the central axis of the metal structure 12, which is not limited by the present disclosure. A length and a depth of the recess 123 are not limited by the present disclosure. As shown in FIG. 1, the bottom edge of the recess 123 is close to the central axis of the metal structure 12.

In some embodiments, the head 121 of the metal structure 12 may have an arrow shape. The shape of the tail 122 of the metal structure 12 can have an axisymmetric shape, such as a rectangle, and an isosceles trapezoid, etc.

In some embodiments, the shape of the head 121 can be an arrow. The two sides of the arrow may be curved. The two sides of the arrow can be edges between the arrow-tip of each head 121 and ends of the arrow-bottom of each head 121, i.e., arrow-sides of each head 121.

In some embodiments, the head 121 of the metal structure 12 has a solid structure, and the other portion of the metal structure 12 except the head 121 may be a solid or a hollow structure, which is not limited by the present disclosure.

In some embodiments, the entire metal structure 12 can have a hollow structure.

In some embodiments, the material used for the metal structure 12 may be a metal material, such as copper or aluminum, or another metal material capable of conducting electricity.

According to embodiments of the present disclosure, in an actual application, the antenna 1 can be fixed on the upper surface of the substrate 11. The antenna 1 can be electrically connected to the substrate 11 and then connected to an external circuit. When the antenna 1 receives an electromagnetic wave signal, converts the electromagnetic wave signal into an electrical signal, and sends the electrical signal to the external circuit, or when the antenna 1 converts the electrical signal received from the external circuit into the electromagnetic wave signal, and sends the electromagnetic wave signal out, a current flows through the two metal structures 12 of the antenna 1. The current flowing through one of the metal structures 12 may have an approximate same direction as the current flowing through another of the metal structures 12. The majority of the current flows through the metal structures 12 along edges of the metal structures 12. There may be no current or very weak current flowing in the middle of the metal structures 12. According to embodiments of the present disclosure, at least one side of each metal structure 12 between the head 121 and the tail 122 includes at least one recess 123, an effective flow path for current can be lengthened. As such, a size of the antenna 1 can be decreased, thereby realizing miniaturization of the antenna 1.

The antenna 1 consistent with the present disclosure includes the substrate 11, the dipole antenna disposed on the upper surface of the substrate 11. The dipole antenna includes two metal structures 12 symmetrically arranged. Each of the metal structures 12 has an axisymmetric structure. Each of the metal structures 12 includes the head 121, which is proximal to another of the metal structures 12, and the tail 122, which is distal to the other of the metal structures 12. At least one side of each metal structure 12 between the head 121 and the tail 122 includes at least one recess 123. When the antenna 1 is in application, effective flow path for the current flowing through the antenna can be lengthened. As such, a size of the antenna 1 can be decreased, thereby realizing miniaturization of the antenna 1.

Figure 2:
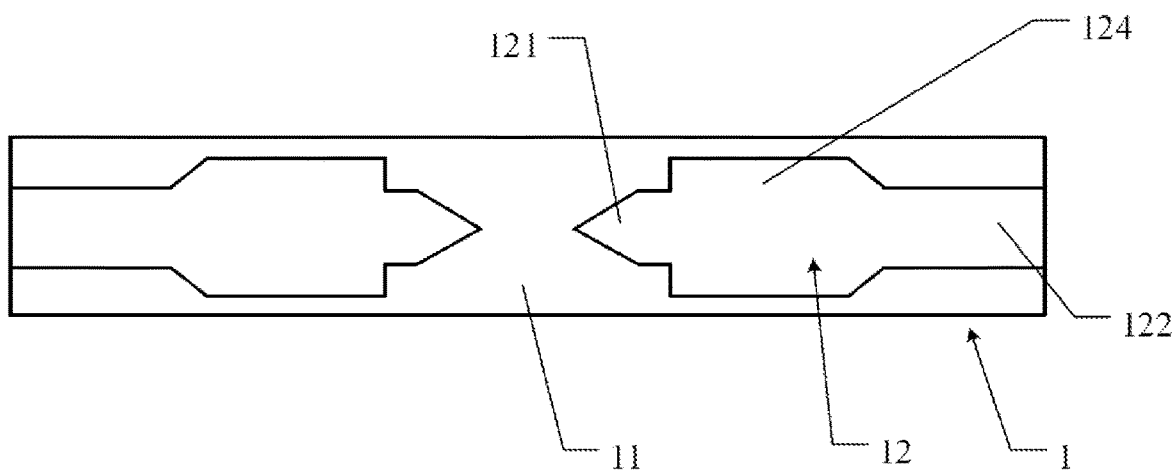
FIG. 2 is a structural diagram of another example of an antenna according to some other embodiments of the present disclosure.

FIG. 2 is a structural diagram of another example of the antenna 1 according to some other embodiments of the present disclosure. FIG. 2 shows an example of structures of the antenna consistent with the disclosure and is not intended to limit the present disclosure. Description of the features of the antenna shown in FIG. 2 that are same as or similar to those of the antenna described above in connection with FIG. 1 is omitted. In the example shown in FIG. 2, the recesses 123 of the antenna 1 are symmetrically disposed on two sides of a metal structures 12 between the head 121 and the tail 122. Each side of the metal structure 12 includes at least one protrusion 124.

In some embodiments, the protrusions 124 of the antenna 1 are symmetrically disposed at two sides of the metal structure 12 between the head 121 and the tail 122. That is, the protrusions 124 are disposed at both the upper side and the lower side of the metal structure 12 between the head 121 and the tail 122. The protrusion 124 at the upper side of the metal structure 12 is axisymmetric with the protrusion 124 at the lower side of the metal structure 12. At least one protrusion 124 is disposed at the upper side of the metal structure 12 and at least one protrusion 124 is disposed at the lower side of the metal structure 12. The two metal structures 12 of the dipole antenna are symmetrically arranged, and each of the two metal structures 12 has an axisymmetric structure, therefore, the antenna 1 consistent with the present disclosure has a completely symmetrical structure.

Whether the antenna 1 is symmetrically structured can affect a radiation effect of the antenna 1. The more the antenna 1 is symmetrically structured, the more uniform can the radiation effect of the antenna 1 be in all directions. According to embodiments of the present disclosure, the protrusions 124 of the antenna 1 are symmetrically disposed on two sides of the metal structure 12 between the head 121 and the tail 122. Each side of the metal structure 12 includes at least one protrusion 124. The symmetrically arranged protrusions 124 on two sides of the metal structure 12 can further increase the effective flow path of the current and reduce the size of the antenna 1. In addition, the antenna 1 can have a completely symmetrical structure, which can result in a better radiation effect in all directions.

In some embodiments, a shape of the head 121 can be an arrow. Two sides of the arrow can also be curved. The two sides of the arrow can be edges between the arrow-tip of each head 121 and ends of the arrow-bottom of each head 121, i.e., arrow-sides of each head 121.

In some embodiments, the antenna 1 can achieve a better radiation effect by adjusting lengths and heights of the protrusions 124.

Figure 3:
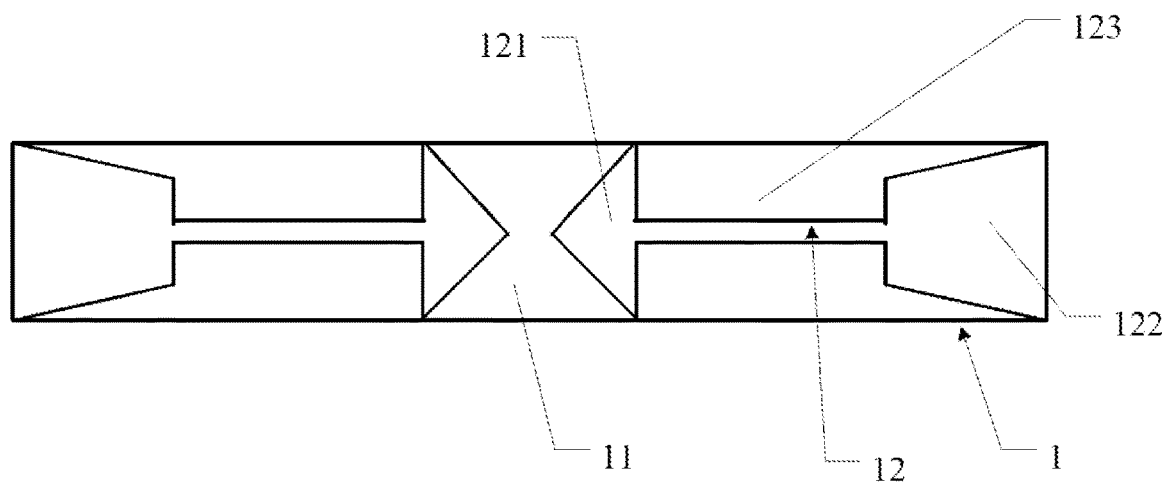
FIG. 3 is a structural diagram of another example of an antenna according to some other embodiments of the present disclosure.

FIG. 3 is a structural diagram of another example of the antenna 1 according to some other embodiments of the present disclosure. Description of the features of the antenna shown in FIG. 3 that are same as or similar to those of the antenna described above in connection with FIG. 1 and/or FIG. 2 is omitted. In the example shown in FIG. 3, the bottom edge of a recess 123 can be perpendicular to two side edges of that recess 123. In some embodiments, a shape of a tail 122 can be a rectangle. A side of the rectangle can be perpendicular to the bottom edge of the corresponding recess 123.

Compared to a case in which angels between the bottom edge of a recess 123 and side edges of the recess 123 are obtuse angles, the bottom edge of a recess 123 being perpendicular to the two side edges of the recess 123 can further increase a length of edges of the metal structure. In some embodiments, the bottom edge of the recess 123 is perpendicular to the two side edges of that recess 123, and the tail 122 can be a rectangle in shape, and the sides of the rectangle can be perpendicular to the bottom edge of the corresponding recess 123. As such, the effective flow path of the current can be lengthened, and the size of the antenna 1 can be further reduced.

In some embodiments, as shown in FIG. 3, the tail 122 can be a trapezoid in shape, and parallel edges of the trapezoid can be perpendicular to the bottom edge of the corresponding recess 123.

In some embodiments, since each of the metal structures is axisymmetric, each tail 122 can be an isosceles trapezoid in shape. Compared to the scenario in which the tail 122 is a rectangle in shape, the tail 122 being a trapezoid in shape can further increase the length of edges of the tail 122 of the metal structure 12. As such, the effective flow path of the current can be further lengthened, and the size of the antenna 1 can be further reduced.

Further, in some embodiments, the bottom edge of a recess 123 is close to the central axis of the metal structure 12.

For the substrate 11 with certain preset size, the closer the bottom edge of a recess 123 of a metal structure 12 is to the central axis of the metal structure 12, the closer are the edges of the corresponding head 121 and the corresponding tail 122 of the metal structure 12 to the edges of the substrate 11 as compared to the bottom edge of the recess 123. As such, the length of the edges of the head 121, and the length of the edges of the tail 122 can be increased, thereby lengthening the effective flow path of the current and allowing the size of the antenna to be further reduced.

Figure 4:
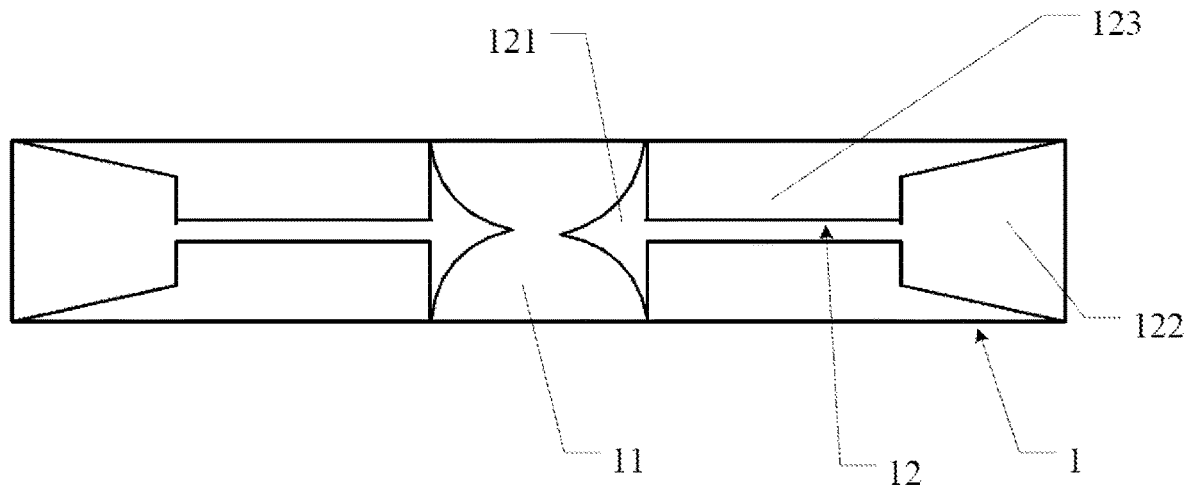
FIG. 4 is a structural diagram of another example of an antenna according to some other embodiments of the present disclosure.

FIG. 4 is a structural diagram of another example of the antenna 1 according to some other embodiments of the present disclosure. Description of the features of the antenna shown in FIG. 4 that are same as or similar to those of the antenna described above in connection with FIG. 2 and/or FIG. 3 is omitted. In the example shown in FIG. 4, the shape of the head 121 of the antenna 1 can be an arrow. Edges between the arrow-tip of a head 121 and ends of the arrow-bottom of the head 121, i.e., arrow-sides of the head 121, may be straight or curved.

In some embodiments, the arrow-sides of a head 121 can recess toward a center of the head 121. In some other embodiments, the arrow-sides of the head 121 can protrude outward from the head 121.

The antenna 1 consistent with the present disclosure, for example the antenna 1 described above in connection with FIG. 2 or FIG. 3, has a symmetric structure, which can lead to a good radiation effect. In some embodiments, as described above in connection with FIG. 3 or FIG. 4, the shape of a head 121 can be an arrow to achieve a better radiation effect. The arrow-sides of the head 121 can be straight or curved. An arrow-side of the head 121 can recess toward the center of the head 121 or protrude outward from the head 121. As such, angles between the arrow-sides of the head 121 and the arrow-bottom of the head 121 can be adjusted, so as to adjust matching of the antenna 1, which is related to the radiation effect of the antenna 1.

Therefore, in some embodiments, when sizes and shapes of other parts of the metal structures 12 are fixed, the matching of the antenna 1 can be adjusted by controlling the angles between the arrow-bottom and the arrow-sides of a head 121. As such, the antenna 1 can have an optimized matching, with which the antenna 1 can have a uniform radiation covering in all directions to achieve the best radiation effect.

Figure 5:
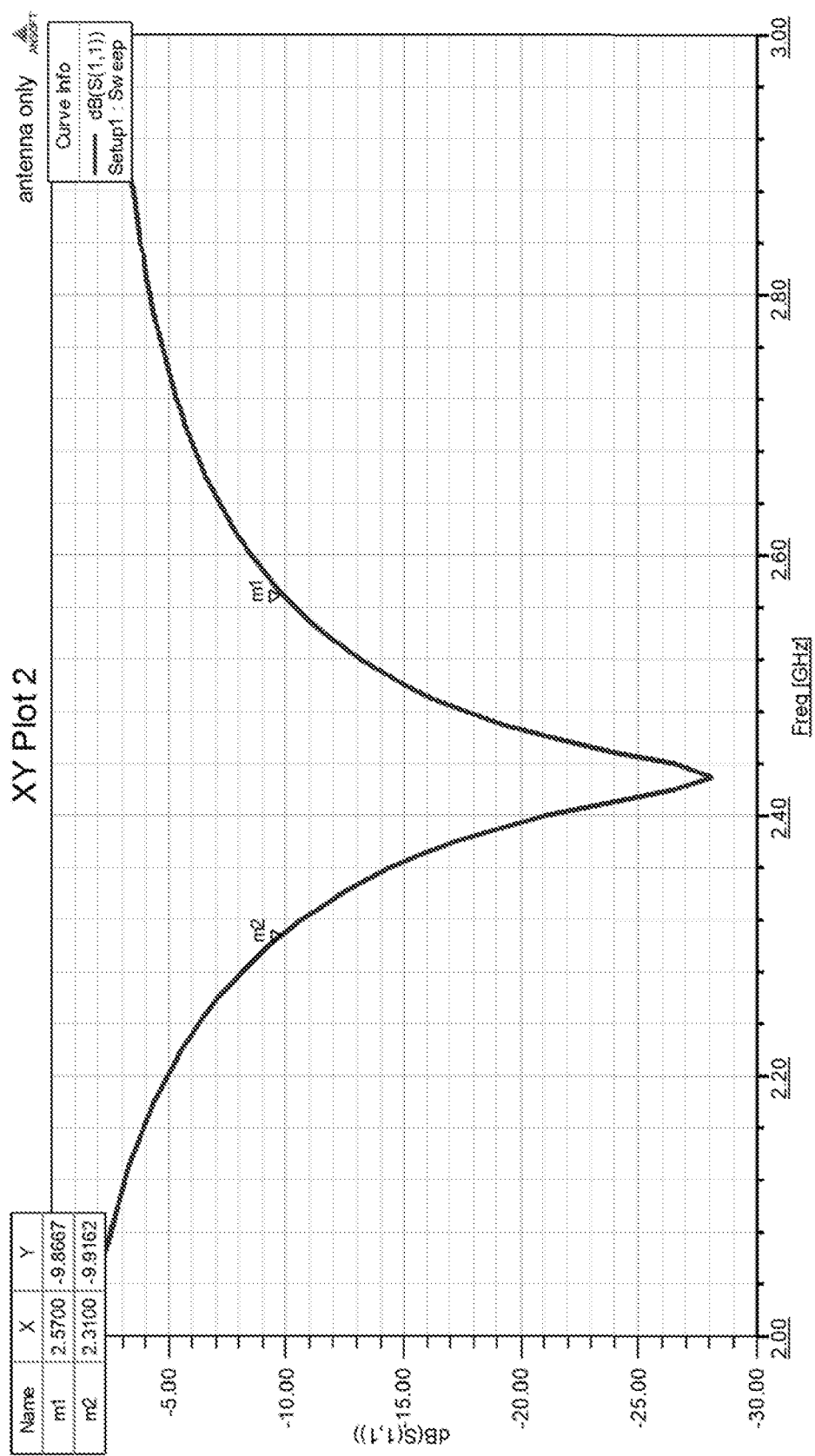
FIG. 5 is a diagram of a bandwidth of an antenna according to some embodiments of the present disclosure.
Figure 6:
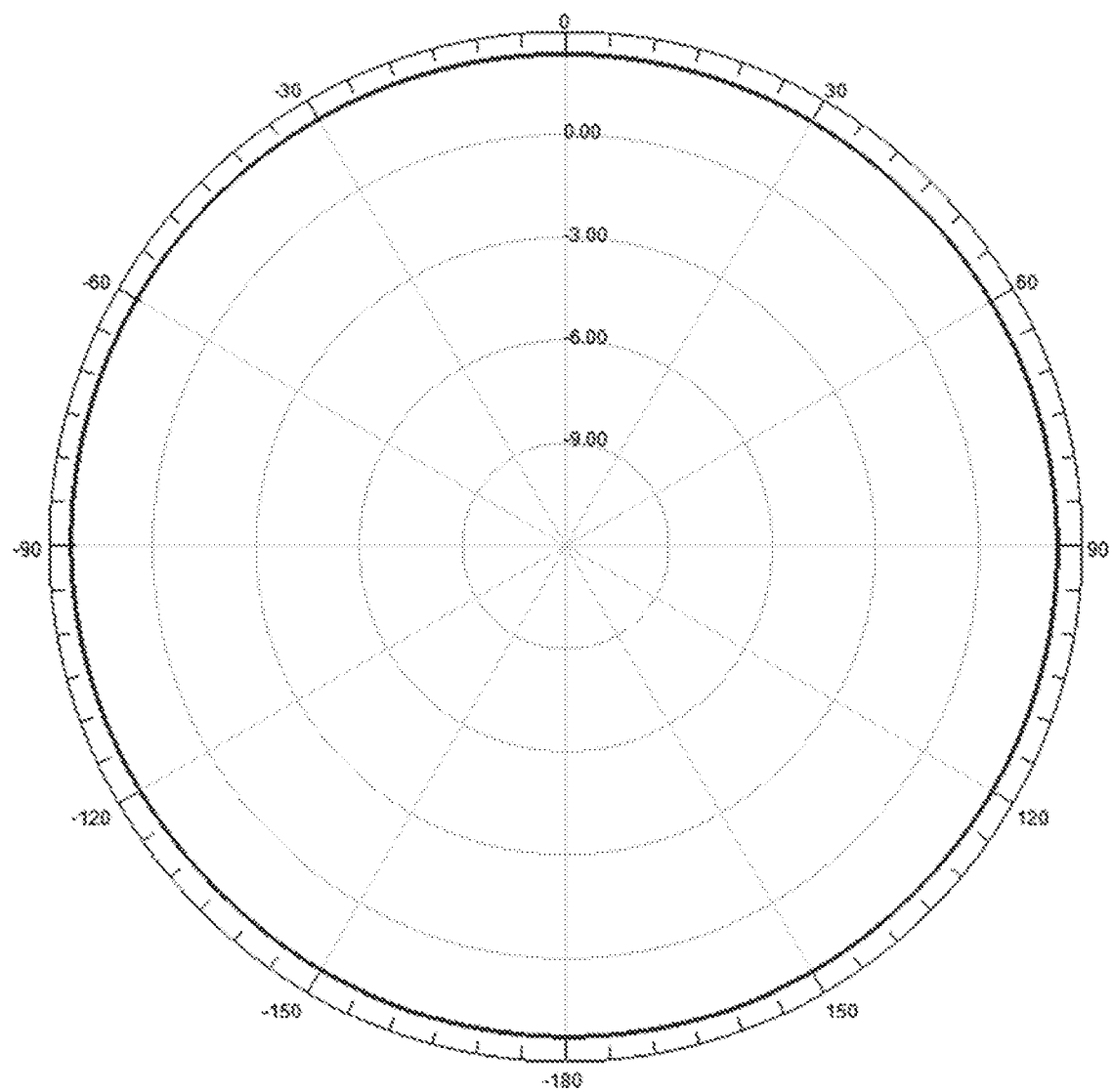
FIG. 6 is a diagram showing radiation directions of an antenna according to some embodiments of the present disclosure.

FIG. 5 is a diagram of a bandwidth of an antenna according to some embodiments of the present disclosure, and FIG. 6 is a diagram showing radiation directions of an antenna according to some embodiments of the present disclosure. As shown in FIG. 5 and FIG. 6, the matching of the antenna 1 can be adjusted by controlling the angles between the arrow-bottom and the arrow-sides of a head 121. As such, the antenna 1 can have an optimized matching, with which the antenna 1 can have a uniform radiation covering in all directions to achieve the best radiation effect.

In some embodiment, a metal structure 12 of the antenna 1 can have a hollow structure, and the current flows along the edges of the metal structure 12. Because the current mainly flows along the edges of the metal structure 12, configuring the metal structures 12 as a hollow structure does not have large impact on the current flowing along the edges of the metal structures 12, but the amount of material used for forming the dipole antenna on the substrate 11 can be reduced. As such, the manufacturing costs can be reduced, and the weight of the antenna 1 can be decreased.

Figure 7:
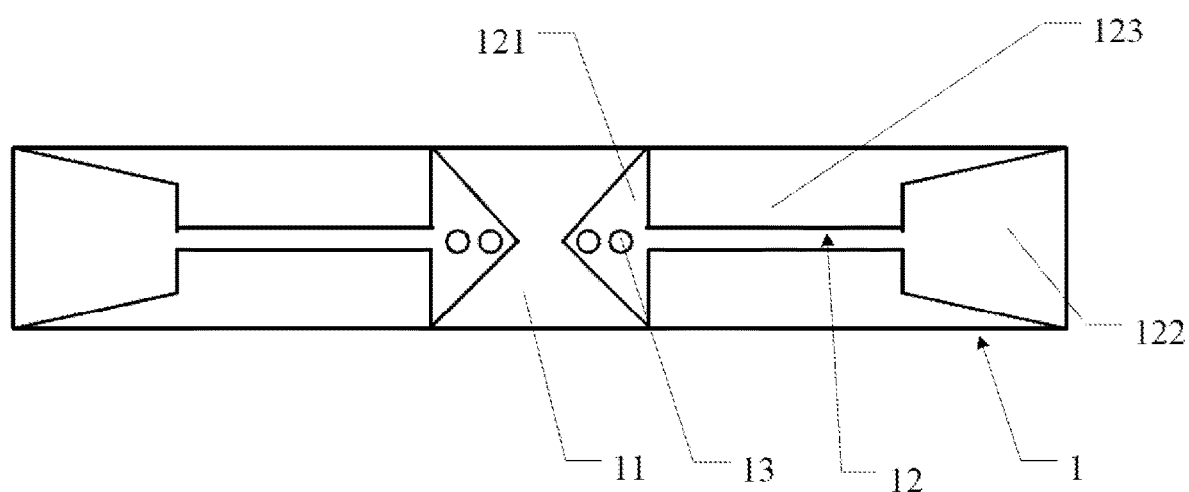
FIG. 7 is a top view of another example of an antenna according to some other embodiments of the present disclosure.
Figure 8:
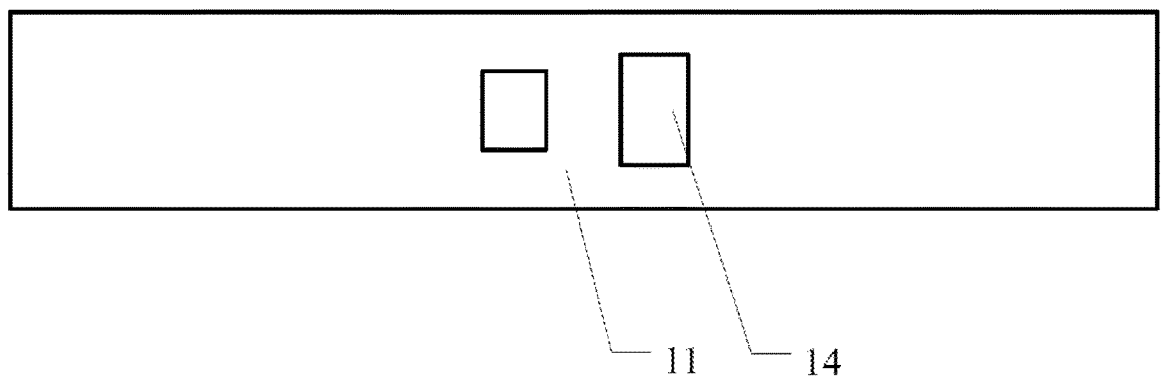
FIG. 8 is a bottom view of the antenna shown in FIG. 7.

FIG. 7 is a top view of another example of the antenna 1 according to some other embodiments of the present disclosure. FIG. 8 is a bottom view of the antenna 1 shown in FIG. 7. Description of the features of the antenna shown in FIGS. 7 and 8 that are same as or similar to those of the antenna described above in connection with any one or more of FIGS. 1-6 is omitted. In the example shown in FIG. 7 and FIG. 8, the antenna 1 further includes one or more metal vias 13 and one or more solder joints 14.

A metal via 13 is disposed in the substrate 11 under a head 121 and penetrates the substrate 11 to be connected to a solder joint 14 disposed on the lower surface of the substrate 11. As such, the metal via 13 is electrically coupled to the solder joint 14, such that the dipole antenna is electrically coupled to the solder joint 14. The antenna 1 can be electrically coupled to an external circuit through a coaxial cable. In some embodiments, the solder joint 14 connected with a via 13 can be disposed at a position on the lower surface of the substrate 11 that corresponds to that metal via 13.

By using the one or more metal vias 13 and the one or more solder joints 14, the antenna 1 can be more easily coupled to the external circuit, and the manufacturing costs can be reduced.

Figure 9:
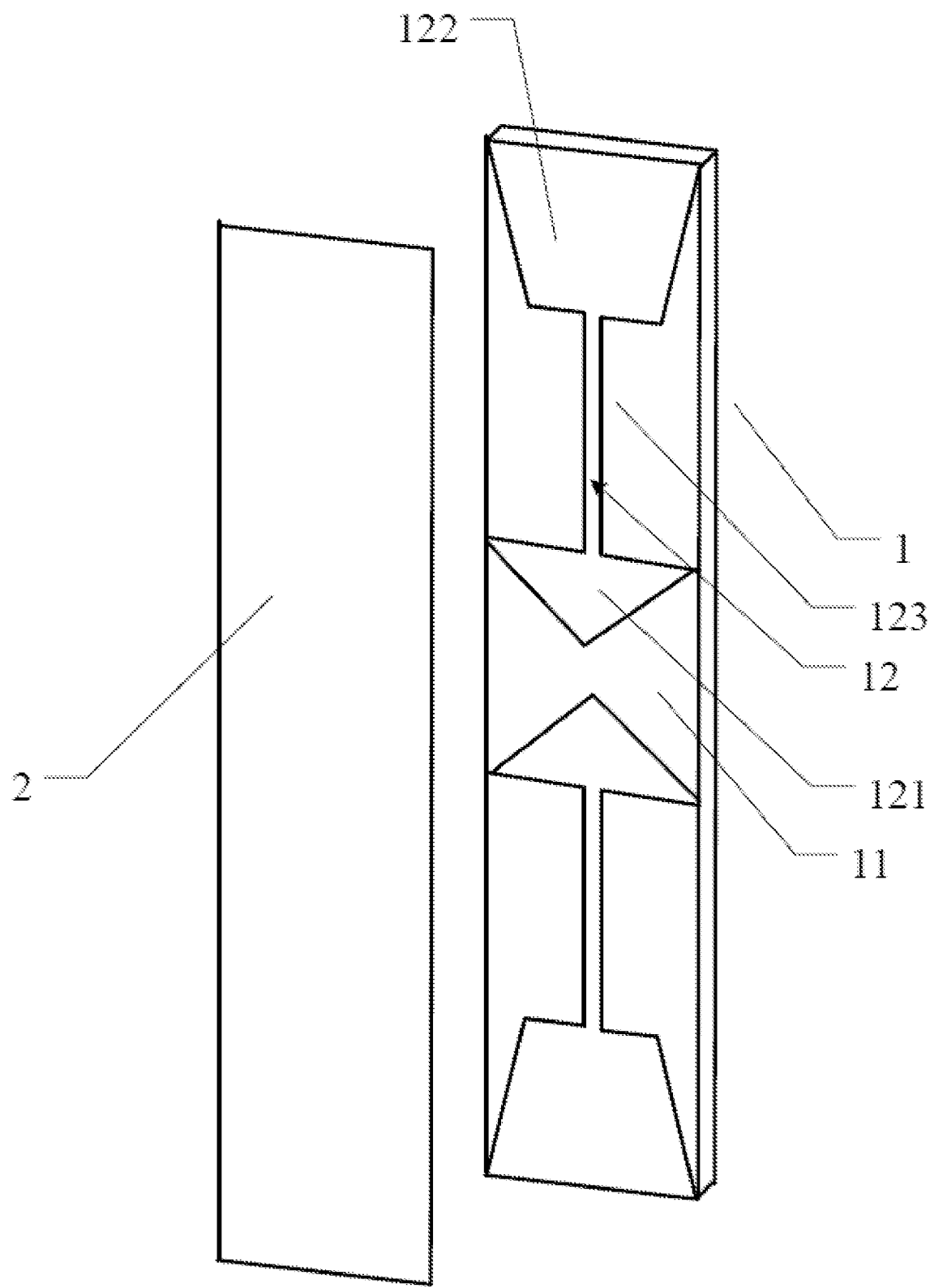
FIG. 9 is a structural diagram of an example of communication assembly according to some embodiments of the present disclosure.

Another aspect of the present disclosure provides a communication assembly. FIG. 9 is a structural diagram of an example of a communication assembly according to some embodiments of the present disclosure. As shown in FIG. 9, the communication assembly consistent with the present disclosure includes a metal parasitic unit 2 and the antenna 1.

The antenna 1 includes the substrate 11 and the dipole antenna disposed on the upper surface of the substrate 11. The metal parasitic unit 2 is disposed within a preset distance from the antenna 1 and has substantially the same extending direction as the antenna 1.

In some embodiments, the substrate 11 can be a PCB substrate, and the dipole antenna can be disposed on the upper surface of the substrate 11 by printing. The dipole antenna can be configured to transmit and receive signal within certain fixed frequency range.

Figure 10:
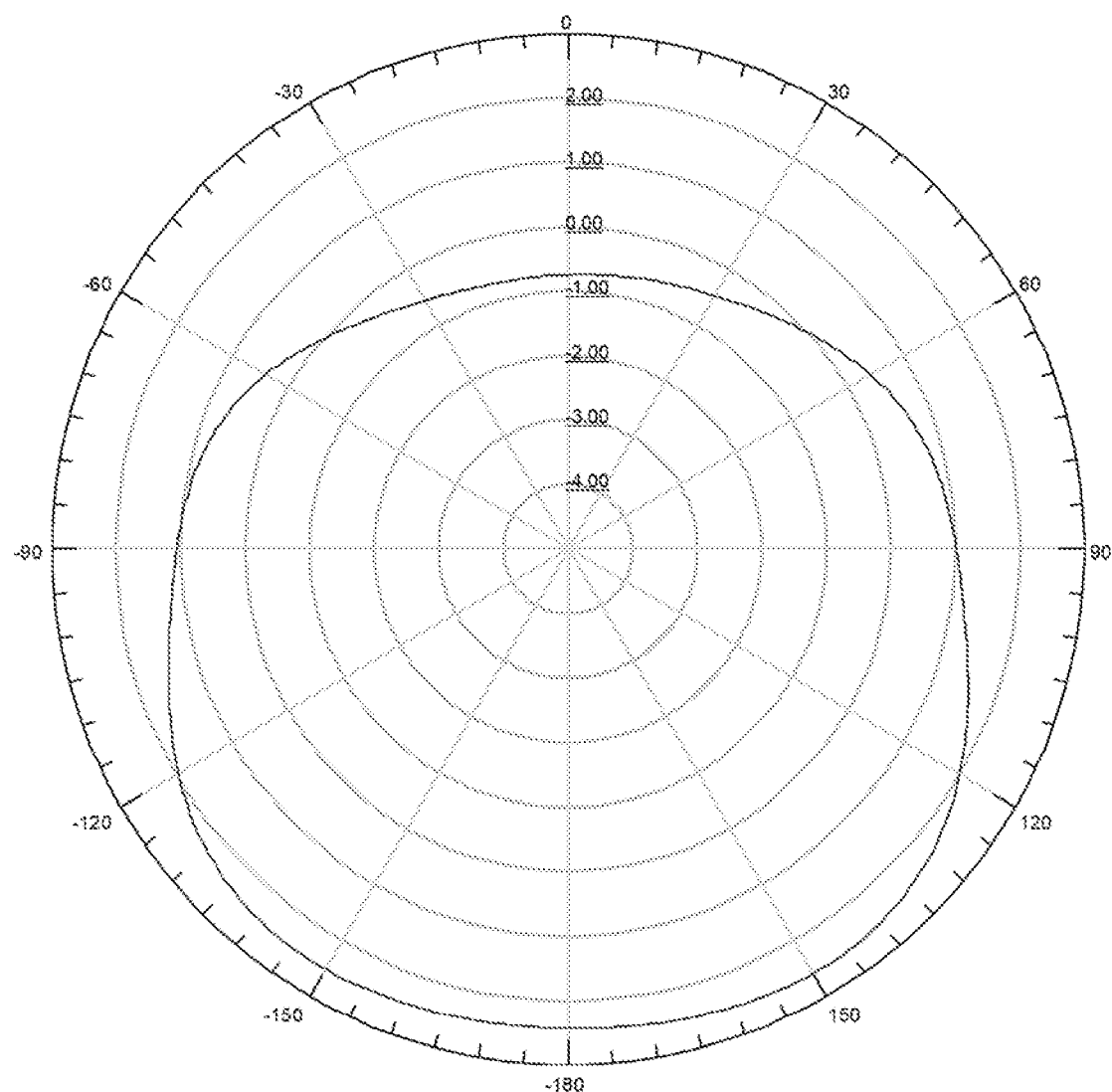
FIG. 10 is a diagram showing radiation directions of an antenna under the influence of a metal part according to some embodiments of the present disclosure.

In practical applications, the antenna 1 can be installed in an apparatus such as a robot or an unmanned aerial vehicle (UAV). Metal parts of such an apparatus may interfere with and affect a radiation pattern of the antenna 1. FIG. 10 is a diagram showing radiation directions of an antenna under the influence of a metal part 3 according to some embodiments of the present disclosure. The metal part 3 is located near the antenna 1, and the metal part 3 is described in detail later in the present disclosure. As shown in FIG. 6 and FIG. 10, due to the interference of the metal part, the radiation pattern of the antenna 1 in FIG. 10 is different from the radiation pattern of the antenna 1 in FIG. 6. The radiation direction of the antenna 1 is biased to one side of the 180 degree, where the metal part is located. Consistent with some embodiments of the disclosure, the metal parasitic unit 2 is disposed within the preset distance from the antenna 1 and has substantially the same extending direction as the antenna 1, to counter the interference of the metal part 3 on the radiation direction of the antenna 1. As such, the antenna 1 can have a good radiation effect in all directions.

In the present disclosure, the metal parasitic unit 2 having substantially the same extending direction as the antenna 1 refers to that an angle between the extending direction of the metal parasitic unit 2 and the extending direction of the antenna 1 is within a preset degree range or that the extending direction of the metal parasitic unit 2 is parallel to the extending direction of the antenna 1. The preset degree range of the angle can be, for example, within 10 degree, within 15 degree, or other suitable range, which is not limited by the present disclosure.

The present disclosure does not limit a shape and a size of the metal parasitic unit 2, and the shape of the dipole antenna. The radiation direction of the antenna 1 can be adjusted by adjusting a distance between the metal parasitic unit 2 and the antenna 1, and/or adjusting an angle between the extending direction of the metal parasitic unit 2 and the extending direction of the antenna 1. In some embodiments, the distance between the metal parasitic unit 2 and the antenna 1 can be adjusted to be within the preset distance. In some embodiments, the angle between the extending direction of the metal parasitic unit 1 and the extending direction of the antenna 1 can be adjusted such that the metal parasitic unit 2 has substantially the same extending direction as the antenna 1.

In some embodiments, the communication assembly consistent with the present disclosure includes the metal parasitic unit 2 and the antenna 1. The antenna 1 includes the substrate 11 and the dipole antenna disposed on the upper surface of the substrate 11. The metal parasitic unit 2 is disposed within a preset distance from the antenna 1 and has substantially the same extending direction as the antenna 1. As such, the interference of the metal part 3 on the radiation direction of the antenna 1 can be adjusted by adjusting the metal parasitic unit 2, and hence the antenna 1 can have a good radiation effect in all directions.

Figure 11:
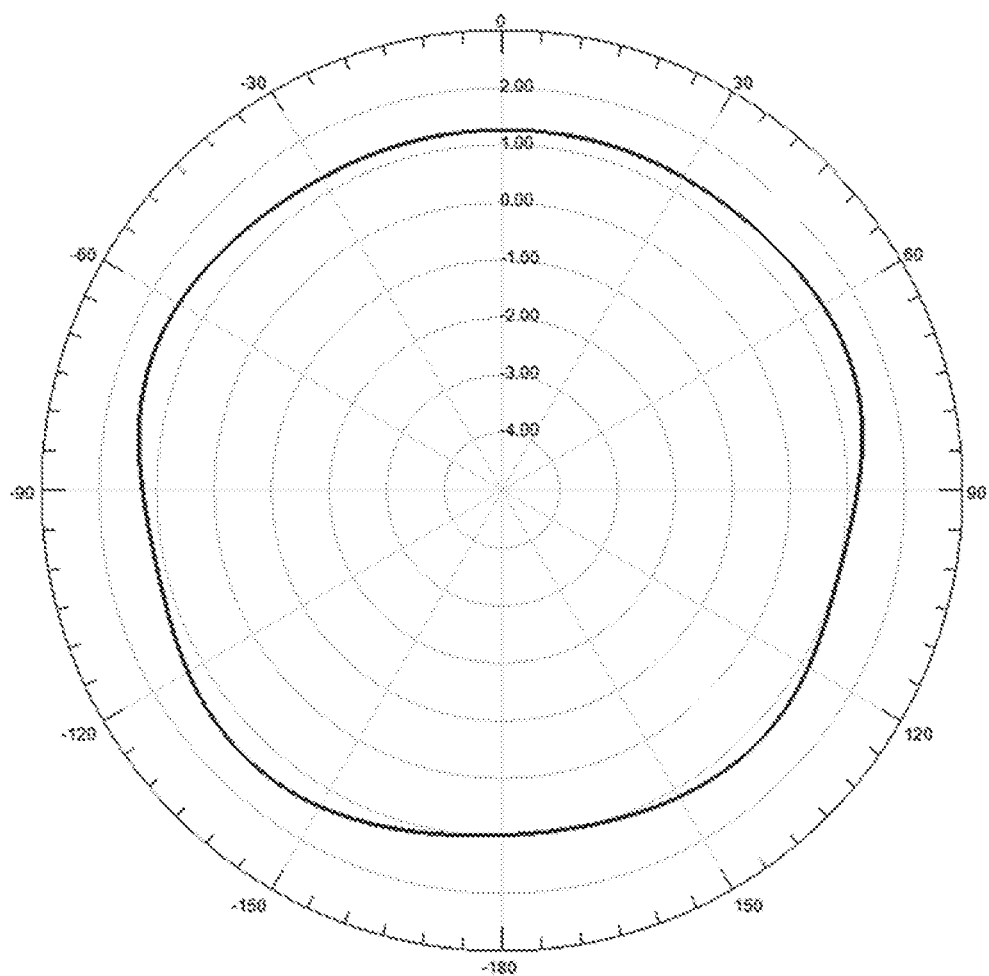
FIG. 11 is a diagram showing radiation directions of an antenna of a communication assembly according to some embodiments of the present disclosure.

FIG. 11 is a diagram showing radiation directions of an antenna of a communication assembly according to some embodiments of the present disclosure. As shown in FIG. 10 and FIG. 11, the metal parasitic unit 2 is disposed within a preset distance from the antenna 1 and has substantially the same extending direction as the antenna 1. As such, the interference of the metal part 3 on the radiation direction of the antenna 1 can be adjusted by adjusting the metal parasitic unit 2. Although the radiation of the antenna 1 is not very uniform in all directions, the antenna 1 can have a relatively good radiation effect in all directions.

In some embodiments, in the communication assembly consistent with the present disclosure, the dipole antenna includes two metal structures 12 arranged symmetrically. Each metal structure 12 has an axisymmetric structure. Each one of the two metal structures 12 includes the head 121 disposed proximal to another one of the two metal structures 12, and the tail 122 disposed distal from the other one of the two metal structures 12. A width of each metal structure 12 may change (e.g., become wider or narrower, etc.) from the head 121 to the tail 122. In some embodiments, at least one side of a metal structure between the head 121 and the tale 122 includes at least one recess 123.

For structure of antenna 1 of these embodiments, references can be made to FIG. 1. For detail principles and implementation manners of the antenna 1, references can be made to descriptions of the antenna 1 consistent with the present disclosure in connection with FIG. 1, and therefore are not repeated here.

In these embodiments, the dipole antenna of the communication assembly includes two metal structures 12 symmetrically arranged. Each of the metal structures 12 has an axisymmetric structure. Each of the two metal structures 12 includes the head 121, which is proximal to another one of the two metal structures 12, and the tail 122, which is distal to the other one of the two metal structures 12. At least one side of each metal structure 12 between the head 121 and the tail 122 includes at least one recess 123. When the antenna 1 is in application, effective flow path for the current flow through the antenna can be lengthened. As such, a size of the antenna 1 can be decreased, thereby realizing miniaturization of the antenna 1.

Further, in some embodiments, the antenna 1 of the communication assembly consistent with the present disclosure includes recesses 123 symmetrically disposed on two sides of a metal structure 12 between the head 121 and the tail 122. Each side of the metal structure 12 includes at least one recess 123.

For structure of antenna 1 of these embodiments, references can be made to FIG. 2. For detail principles and implementation manners of the antenna 1, references can be made to descriptions of the antenna 1 consistent with the present disclosure in connection with FIG. 2, and therefore are not repeated here.

In these embodiments, on the antenna 1 of the communication assembly include protrusions 124 symmetrically disposed on two sides of a metal structure 12 between the head 121 and the tail 122. Each side of the metal structure 12 includes at least one protrusion 124. The antenna 1 can have a completely symmetrical structure, which can further improve the radiation effect of the antenna 1 in all directions.

In some embodiments, referring to FIG. 3, in the antenna 1 of the communication assembly, the bottom edge of each recess 123 can be perpendicular to two side edges of that recess 123. In some embodiments, a shape of each tail 122 can be a rectangle. A side of the rectangle can be perpendicular to the bottom edge of the corresponding recess 123.

In some embodiments, the tail 122 of the antenna 1 can be a trapezoid in shape, and parallel edges of the trapezoid can be perpendicular to the bottom edge of the corresponding recess 123.

Further, in some embodiments, the bottom edge of a recess 123 of the antenna 1 is close to the central axis of the metal structure 12.

For structure of antenna 1 of these embodiments, references can be made to FIG. 3. For detail principles and implementation manners of the antenna 1, references can be made to descriptions of the antenna 1 consistent with the present disclosure in connection with FIG. 3, and therefore are not repeated here.

In these embodiments, based on the communication assembly described above, the bottom edge of each recess 123 can be perpendicular to two side edges of that recess 123. In some embodiments, a shape of each tail 122 can be a rectangle. A side of the rectangle can be perpendicular to the bottom edge of the corresponding recess 123. In some embodiments, the tail 122 of the antenna 1 can be a trapezoid in shape, and parallel edges of the trapezoid can be perpendicular to the bottom edge of the corresponding recess 123. The bottom edge of a recess 123 of the antenna 1 is close to the central axis of the metal structure 12. As such, the length of the edges of the head 121, and the length of the edges of the tail 122 can be increased, thereby lengthening the effective flow path of the current and allowing the size of the antenna to be further reduced. The communication assembly can have a reduced size and a more compact structure.

Further, in the antenna 1 of the communication assembly consistent with the present disclosure, the shape of the head 121 of the antenna 1 can be an arrow. Edges between the arrow-tip of a head 121 and ends of the arrow-bottom of the head 121, i.e., arrow-sides of the head 121, may be straight or curved.

In some embodiments, the arrow-sides of each head 121 can recess toward a center of the head 121. In some other embodiments, the arrow-sides of each head 121 can protrude outward of the head 121.

For structure of antenna 1 of these embodiments, references can be made to FIG. 4. For detail principles and implementation manners of the antenna 1, references can be made to descriptions of the antenna 1 consistent with the present disclosure in connection with FIG. 4, and therefore are not repeated here.

In the communication assembly consistent with the present disclosure, the shape of the head 121 can be an arrow. The arrow-sides of the head 121 can be straight or curved. The arrow-side of the head 121 can recess toward the center of the head 121 or protrude outward of the head 121. Such that, angles between the arrow-sides of the head 121 and the arrow-bottom of the head 121 can be adjusted, so as to adjust matching of the antenna 1. As such, the antenna 1 can have an optimized matching, with which the antenna 1 can have a uniform radiation covering in all directions to achieve the best radiation effect.

Further, in the communication assembly provided in this embodiment, the other part of the metal structure 12 of the antenna 1 except the head 121 has a hollow structure, and current flows mainly along the edges of each metal structure 12.

In the communication assembly consistent with the present disclosure, the other part of the metal structure 12 of the antenna 1 except the head 121 is configured to increase the effective flow path of the current. Because the current mainly flows along the edges of the metal structure 12, configuring the metal structures 12 as a hollow structure does not have large impact on the current flowing along the edges of the metal structures 12, but the amount of material used for forming the dipole antenna on the substrate 11 can be reduced. As such, the manufacturing costs can be reduced, and the weight of the antenna 1 can be decreased.

Further, in some embodiments, the antenna 1 of the communication assembly consistent with the present disclosure further includes one or more metal vias 13 and one or more solder joints 14.

A metal via 13 is disposed in the substrate 11 under one of the heads 121 and penetrates the substrate 11 to be connected to a solder joint 14 disposed on the lower surface of the substrate 11.

For the metal via 13 of antenna 1 of the communication assembly in these embodiments, references can be made to descriptions above in connection with FIG. 7. For the solder joint 14 of antenna 1 of the communication assembly in these embodiments, reference can be made to descriptions above in connection with FIG. 8. For detail principles and implementation manners of the metal vias 13 and the solder joints 14 of the antenna 1 of the communication assembly, references can be made to descriptions of the antenna 1 consistent with the present disclosure in connection with FIG. 7 and FIG. 8, and therefore are not repeated here.

The metal via 13 is disposed in the substrate 11 under a head 121 and penetrates the substrate 11 to be connected to a solder joint 14 disposed on the lower surface of the substrate 11. In this way, it can be easy to electrically couple the antenna 1 to the external circuit, which can reduce the manufacturing costs.

In some embodiments, in the communication assembly consistent with the present disclosure, a placement direction, i.e., an extending direction of the metal parasitic unit 2 is parallel to the antenna. A perpendicular distance between the metal parasitic unit 2 and the antenna can be one tenth of a wavelength corresponding to an operating frequency of the antenna 1.

In some embodiments, the metal parasitic unit 2 can have an elongated shape. An effective length of the metal parasitic unit 2 can be less than a half of the wavelength corresponding to the operating frequency of the antenna 1.

In some embodiments, the metal parasitic unit 2 can have an elongated shape; however, the present disclosure does not limit a shape of edges of the elongated shape.

As described above, the metal parasitic unit 2 can be arranged in such a way that the placement direction of the metal parasitic unit 2 is parallel to the antenna and the perpendicular distance between the metal parasitic unit 2 and the antenna is one tenth of the wavelength corresponding to the operating frequency of the antenna 1. As such, the parasitic element 2 can be prevented from being a reflector, and radiation of the antenna 1 in the direction of the metal parasitic unit 2 can be decreased. In addition, the structure of the communication assembly can be simpler and more compact. In actual applications, when the placement direction of the metal parasitic unit 2 and the distance between the metal parasitic unit 2 and the antenna 1 are determined, the effective length of the metal parasitic unit 2 can be adjust to be less than a half of the wavelength corresponding to the operating frequency of the antenna 1, and an effective width of the metal parasitic unit 2 can be adjust according to an actual radiation effect of the antenna 1. By adjusting the effective length and effective width of the metal parasitic unit 2, the influence of the metal part 3 near the antenna 1 on the antenna radiation can be offset, and the radiation effect of the antenna 1 is optimized.

In some embodiments, in the communication assembly, the metal parasitic unit 2 can be fixed by a support. In some embodiments, the support can be a plastic frame. The fixing manner is not limited by the present disclosure. For example, the metal parasitic unit 2 can be fixed by the support by screwing or snapping, etc. The support can be a plastic frame, to prevent an influence of the support on the radiation effect of the antenna 1.

Figure 12:
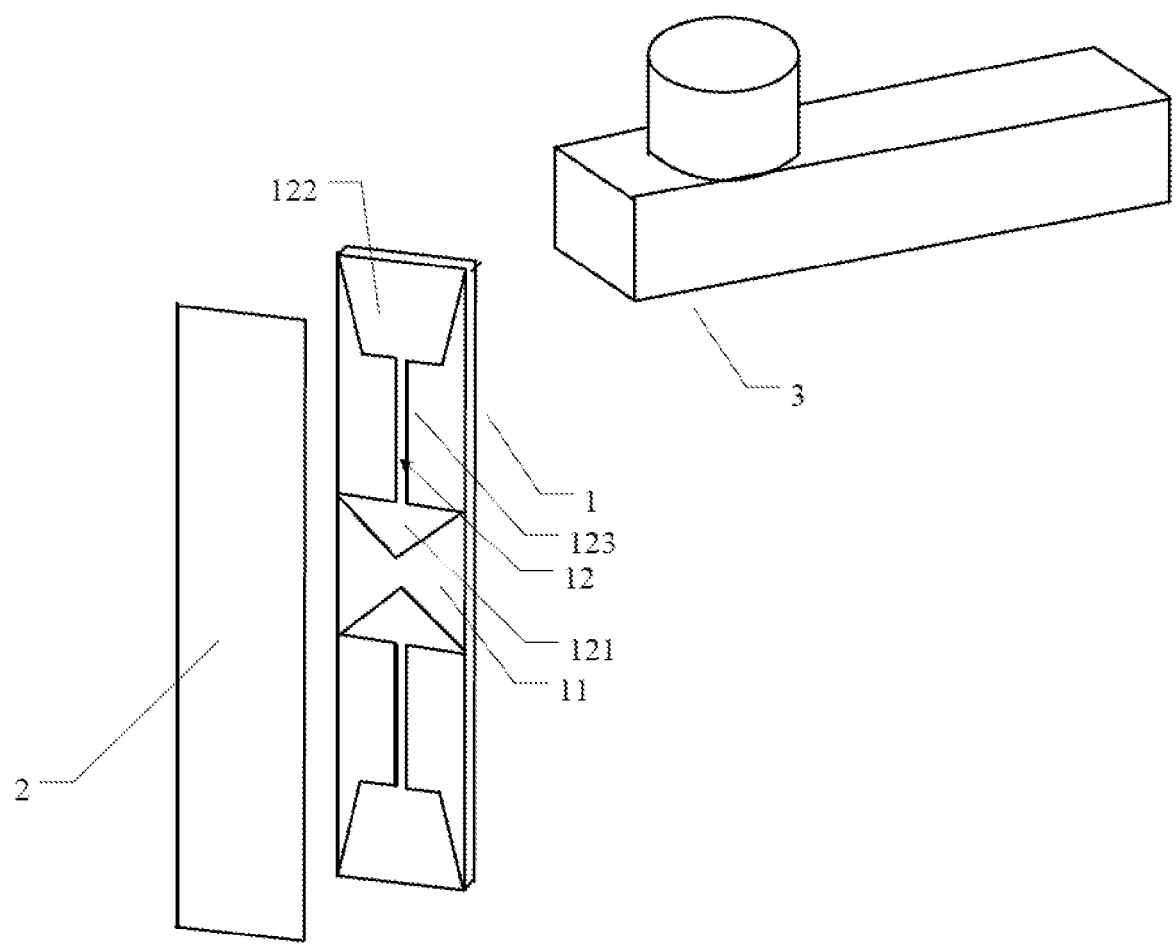
FIG. 12 is a structural diagram of a portion of an unmanned aerial vehicle (UAV) according to some embodiments of the present disclosure.

Another aspect of the present disclosure provides a UAV. FIG. 12 is a structural diagram of a portion of the UAV according to some embodiments of the present disclosure. The UAV consistent with the present disclosure includes a fuselage, a metal part 3 disposed at the fuselage, and a communication assembly, for example, any of the example communication assemblies described above.

The metal part 3 is located on a portion of the fuselage proximal to the communication assembly.

The metal part 3 is located proximal to the communication assembly. In the communication assembly, whether the antenna 1 or the metal parasitic unit 2 is closer to the metal part 3 is not limited by the present disclosure.

In some embodiments, the fuselage includes a body, and/or a load carried by the body.

In some embodiments, the metal part 3 is located on the fuselage proximal to the communication assembly. The metal part 3 can affect the radiation effect of the antenna 1 of the communication assembly. In some embodiments, the radiation effect of the antenna 1 can be adjusted by adjusting the displacement direction of the metal parasitic unit 2, and/or the distance between the metal parasitic unit 2 and the antenna 1. In some other embodiments, when the displacement direction of the metal parasitic unit 2, and the distance between the metal parasitic unit 2 and the antenna 1 are determined, the radiation effect of the antenna 1 can be adjusted by adjusting the effective length of the metal parasitic unit 2 and/or the effective width of the metal parasitic unit 2. As such, the radiation effect of the antenna 1 can be optimized, and the antenna 1 can have radiation in all directions.

For details of principles and implementation manners of the communication assembly of the UAV consistent with the present disclosure, references can be made to descriptions about the communication assembly above, and therefore details are not repeated here.

In these embodiments, the UAV includes the fuselage, the metal part 3 disposed on the fuselage, and the communication assembly according to descriptions about the communication assembly above. The metal part 3 is located on a portion of the fuselage proximal to the communication assembly. Through adjusting the metal parasitic unit 2, the radiation effect of the antenna 1 can be optimized, and the antenna 1 can have radiation in all directions.

In some embodiments, the UAV further includes an arm and a leg angularly connected to the arm, and one of the metal part 3 and the communication assembly is disposed at the leg, and the other of the metal part 3 and the communication assembly is disposed at the arm.

In some embodiments, the metal part 3 is disposed at the arm, the antenna 1 of the communication assembly is disposed at one side of the leg proximal to the metal part 3, and the metal parasitic unit 2 of the communication assembly is disposed at another side of the leg distal from the metal part 3.

In these embodiments, by using the connecting parts of the UAV, the metal part 3 can be disposed at the leg, and the communication assembly can be disposed at the arm; or the metal part 3 can be disposed at the arm, and the communication assembly can be disposed at the leg. As such, a distance and orientation between the metal part 3 can the communication assembly can be fixed. When the distance and orientation between the metal part 3 can the communication assembly are fixed, it is easy to adjust the metal parasitic unit 2, so as to optimize the radiation effect of the antenna 1 easily. The metal part 3 affects the radiation directs of the antenna 1, resulting in the radiation directions of the antenna 1 biased toward a side of the metal part 3. Therefore, when the metal part 3 is disposed at the arm, the antenna 1 of the communication assembly is disposed at one side of the leg proximal to the metal part 3, and the metal parasitic unit 2 of the communication assembly is disposed at another side of the leg distal from the metal part 3, a adjusting range of the metal parasitic unit 2 can be effectively reduced, and hence it is easier to optimize the radiation effect of the antenna 1.

The above are only some embodiments of the present disclosure and are not intended to limit the scope of the disclosure. Based on embodiments of the present disclosure and contents of the drawings, equivalent transformation of structures or processes to be directly or indirectly applied to other related technologies, shall fall within the scope of the present disclosure.

It is intended that the specification and embodiments be considered as examples only and not to limit the scope of the disclosure. Any modification and equivalently replacement for the technical solution of the present disclosure should all fall in the spirit and scope of the technical solution of the present disclosure.

What is claimed is:

1. An antenna comprising:
a substrate; and
a dipole antenna disposed on a surface of the substrate and including a first metal structure and a second metal structure arranged symmetrically with respect to each other;
wherein:
the first metal structure includes a head at a first end of the first metal structure proximal to the second metal structure, a tail at a second end of the first metal structure distal from the second metal structure, and a middle portion extending from a center of a bottom edge of the head distal from the second metal structure to a center of an upper edge of the tail proximal to the second metal structure;
the tail has a trapezoidal shape, a length of the upper edge of the tail is less than a length of the bottom edge of the head, and a length of a bottom edge of the tail distal from the second metal structure is equal to the length of the bottom edge of the head; and
a width of the first metal structure varies between the first end and the second end.

2. The antenna according to claim 1, wherein a width of at least one portion of the first metal structure between the first end and the second end is smaller or larger than a width of the head and/or a width of the tail.

3. The antenna according to claim 2, wherein the first metal structure includes at least one recess at one side of the first metal structure between the first end and the second end.

4. The antenna according to claim 3, wherein:
the at least one recess is at least one first recess;
the first metal structure further includes at least one second recess at another side of the first metal structure between the first end and the second end; and
the at least one first recess and the at least one second recess are symmetrically disposed at the one side and the other side of the first metal structure, respectively.

5. The antenna according to claim 3, wherein the head has an arrow shape.

6. The antenna according to claim 5, wherein an arrow-side connecting a tip of the head and an end of the bottom edge of the head is straight or curved.

7. The antenna according to claim 6, wherein the arrow-side recesses toward a center of the head or protrudes outward from the head.

8. The antenna according to claim 3, wherein a bottom edge of one of the at least one recess is perpendicular to two side edges of the one of the at least one recess.

9. The antenna according to claim 8, wherein:
the upper edge of the tail and the bottom edge of the tail are perpendicular to the bottom edge of the one of the at least one recess.

10. The antenna according to claim 1, wherein one or both of the first metal structure and the second metal structure have a hollow structure.

11. The antenna according to claim 1,
wherein:
the surface is a first surface of the substrate; and
the substrate has a second surface opposite to the first surface;
the antenna further comprising:
a metal via disposed in and penetrating the substrate at a location corresponding to the head; and
a solder joint disposed at the second surface of the substrate and is connected to the metal via.

12. A communication assembly comprising:
an antenna including:
a substrate; and
a dipole antenna disposed on a surface of the substrate; and
a metal parasitic unit disposed within a preset distance from the antenna;
wherein:
an extending direction of the metal parasitic unit is substantially same as an extending direction of the antenna; and
the metal parasitic unit has an effective length less than a half of a wavelength corresponding to an operating frequency of the antenna.

13. The communication assembly according to claim 12, wherein:
the dipole antenna includes a first metal structure and a second metal structure arranged symmetrically with respect to each other;
the first metal structure includes a head proximal to the second metal structure and a tail distal from the second metal structure; and
a width of the first metal structure varies between the head and the tail.

14. The communication assembly according to claim 12, wherein the extending direction of the metal parasitic unit is parallel to the extending direction of the antenna.

15. The communication assembly according to claim 14, wherein a perpendicular distance between the metal parasitic unit and the antenna is one tenth of a wavelength corresponding to an operating frequency of the antenna.

16. The communication assembly according to claim 14, wherein the metal parasitic unit has an elongated shape.

17. The antenna according to claim 6, wherein the arrow-side is curved.

* * * * *